US012640978B2

(12) United States Patent
Jividen et al.

(10) Patent No.: US 12,640,978 B2
(45) Date of Patent: May 26, 2026

(54) ROOT CAUSE DETECTION OF ANOMALOUS BEHAVIOR USING NETWORK RELATIONSHIPS AND EVENT CORRELATION

(71) Applicant: State Farm Mutual Automobile Insurance Company, Bloomington, IL (US)

(72) Inventors: Cara Jividen, Dewitt, IL (US); Shannon Paul McMahon, Saint Joseph, IL (US); Scott Ward, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 13 days.

(21) Appl. No.: 18/758,819

(22) Filed: Jun. 28, 2024

(65) Prior Publication Data

US 2024/0356795 A1      Oct. 24, 2024

Related U.S. Application Data

(63) Continuation of application No. 17/378,084, filed on Jul. 16, 2021, now Pat. No. 12,040,935.

(51) Int. Cl.
H04L 41/0631 (2022.01)
G06N 20/00 (2019.01)
(Continued)

(52) U.S. Cl.
CPC ........... H04L 41/064 (2013.01); G06N 20/00 (2019.01); H04L 41/0645 (2013.01);
(Continued)

(58) Field of Classification Search
None
See application file for complete search history.

(56) References Cited

U.S. PATENT DOCUMENTS 6,393,386 B1 *   5/2002   Zager ................... H04L 41/046
                                                          370/254
6,883,119 B1 *   4/2005   Bette ...................... H04L 41/06
                                                          714/48
(Continued)

FOREIGN PATENT DOCUMENTS

CA        2555913 C   * 10/2009   ........... H04L 41/042
WO     WO2019126755       6/2019

OTHER PUBLICATIONS

Non-Final Office Action mailed Oct. 25, 2023 for related U.S. Appl. No. 17/378,084 for "Root Cause Detection of Anomalous Behavior Using Network Relationships and Event Correlation" (27 pages).
(Continued)

Primary Examiner — Sandarva Khanal
(74) Attorney, Agent, or Firm — Lee & Hayes, P.C.

(57) ABSTRACT

A node detects an alert corresponding to an anomalous event during a time period. The alert is correlated with previously detected alerts occurring within the time period and a causal relationship associated with nodes in the networked computing environment. The node may then recursively identify a root cause of the anomalous event detected in the networked computing environment based on a set of correlated alerts. An incident ticket may then be sent to the node identified as the root cause of the anomalous event, and the node may notify other nodes in the network having a causal relationship with the node of the anomalous event.

20 Claims, 6 Drawing Sheets

(51) Int. Cl.
    *H04L 41/12*         (2022.01)
    *H04L 41/5074*     (2022.01)

(52) U.S. Cl.
    CPC ............ *H04L 41/065* (2013.01); *H04L 41/12* (2013.01); *H04L 41/5074* (2013.01)

(56) References Cited

U.S. PATENT DOCUMENTS

| | | | |
|---|---|---|---|
| 7,165,192 | B1 | 1/2007 | Cadieux et al. |
| 8,417,656 | B2 | 4/2013 | Beg |
| 9,122,602 | B1 | 9/2015 | Jewell et al. |
| 10,484,411 | B1* | 11/2019 | Ni ........................... H04L 12/40 |
| 11,128,649 | B1 | 9/2021 | Yeh et al. |
| 11,204,836 | B1 | 12/2021 | Resch et al. |
| 2003/0135610 | A1 | 7/2003 | Ch'ng et al. |
| 2008/0198754 | A1 | 8/2008 | Savoor et al. |
| 2008/0235365 | A1 | 9/2008 | Bansal |
| 2010/0005384 | A1* | 1/2010 | Grabarnik ............. G06Q 10/06 |
| | | | 715/249 |
| 2010/0128860 | A1 | 5/2010 | Kung et al. |
| 2015/0033086 | A1* | 1/2015 | Sasturkar ............. G06F 11/079 |
| | | | 714/57 |
| 2015/0288557 | A1 | 10/2015 | Gates |
| 2016/0080502 | A1* | 3/2016 | Yadav ................... H04L 47/825 |
| | | | 709/227 |
| 2016/0259869 | A1 | 9/2016 | Parikh et al. |
| 2017/0017537 | A1* | 1/2017 | Razin ................. G06F 11/0772 |
| 2017/0075749 | A1 | 3/2017 | Ambichl |
| 2017/0126532 | A1 | 5/2017 | Bansal |
| 2017/0277727 | A1* | 9/2017 | Chen ..................... G06F 16/215 |
| 2017/0294112 | A1 | 10/2017 | Kushnir |
| 2017/0353991 | A1 | 12/2017 | Tapia |
| 2018/0053389 | A1* | 2/2018 | Ouedraogo ...... H04N 21/21805 |
| 2018/0239682 | A1* | 8/2018 | Kaluza ................ G06F 11/3006 |
| 2018/0373580 | A1 | 12/2018 | Ertl |
| 2019/0097876 | A1 | 3/2019 | Abdulghani |
| 2019/0158524 | A1* | 5/2019 | Zadeh ................... H04L 61/103 |
| 2020/0084087 | A1 | 3/2020 | Sharma et al. |
| 2020/0220875 | A1 | 7/2020 | Harguindeguy |
| 2020/0356871 | A1 | 11/2020 | Mueller |
| 2020/0396232 | A1 | 12/2020 | Lee |
| 2021/0014103 | A1 | 1/2021 | Zhang et al. |
| 2021/0117101 | A1 | 4/2021 | Azmandian |
| 2021/0117415 | A1* | 4/2021 | Sriharsha .............. G06F 16/242 |
| 2021/0243069 | A1* | 8/2021 | Hoffman ............. H04L 41/0631 |
| 2021/0320836 | A1* | 10/2021 | Leibkowiz .......... H04L 41/0816 |
| 2021/0351973 | A1* | 11/2021 | Ford .................... H04L 43/067 |
| 2022/0114040 | A1 | 4/2022 | Kumar |
| 2022/0374726 | A1* | 11/2022 | Sethi ................... G06F 16/906 |
| 2023/0016199 | A1 | 1/2023 | Jividen |

OTHER PUBLICATIONS

Office Action for U.S. Appl. No. 17/378,084, mailed on Mar. 17, 2023, Jividen, "Root Cause Detection of Anomalous Behavior Using Network Relationships and Event Correlation", 22 Pages.

Office Action for U.S. Appl. No. 17/378,084, mailed on Jul. 10, 2023, Jividen, "Root Cause Detection of Anomalous Behavior Using Network Relationships and Event Correlation", 25 Pages.

Zillow Group, "Root Cause Detection Among Anomalous Time Series Using Temporal Alignment", retrieved <<https://axiv.org/pdf/2001.01056.pdf>>, 2020, 6 pgs.

\* cited by examiner

100

106

110

Server 108

Network Interface 114

Processor(s) 116

Memory 118

Database 120

Root Cause Manager 122

108

Database 112

Network 104

102

102

Monitored Computing Device 102

Process#1

⋮

Process#N

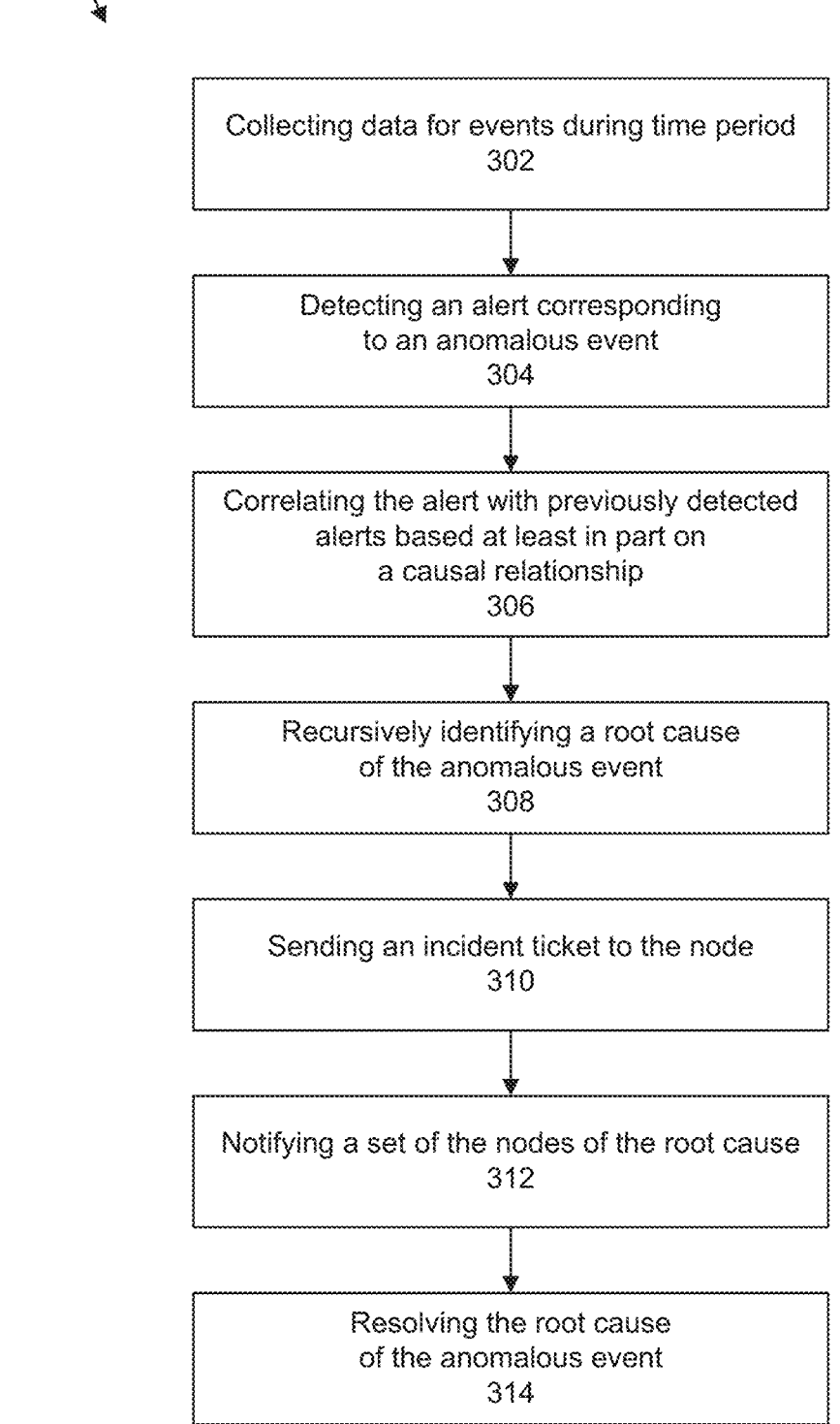

300

Collecting data for events during time period
302

Detecting an alert corresponding
to an anomalous event
304

Correlating the alert with previously detected
alerts based at least in part on
a causal relationship
306

Recursively identifying a root cause
of the anomalous event
308

Sending an incident ticket to the node
310

Notifying a set of the nodes of the root cause
312

Resolving the root cause
of the anomalous event
314

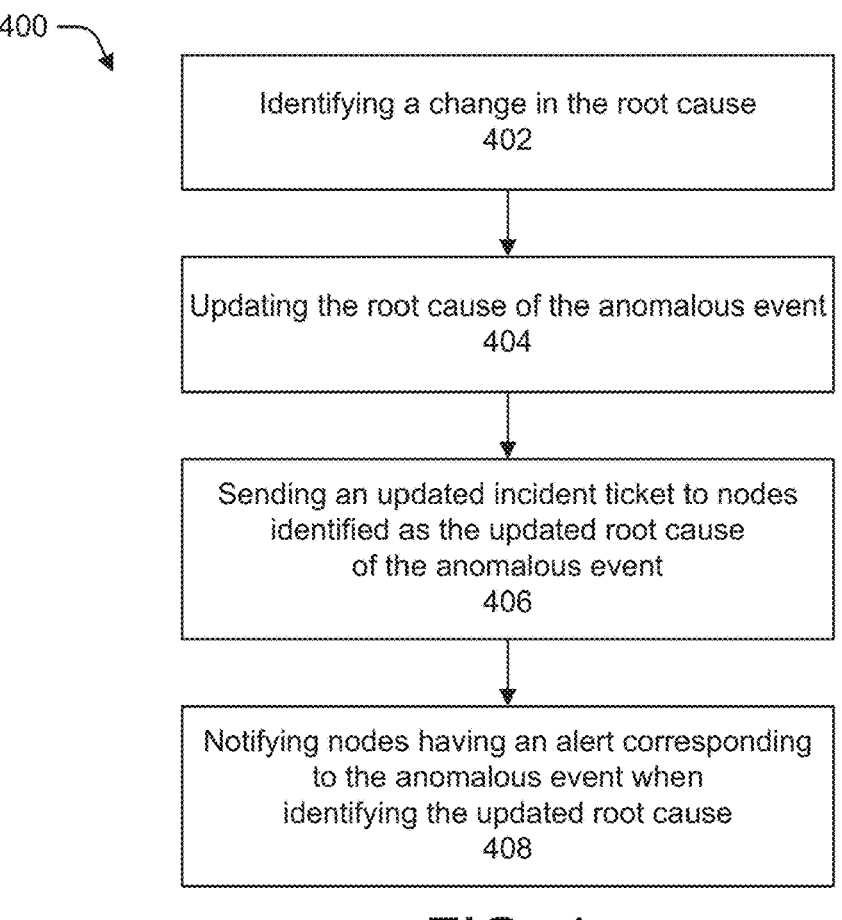

Identifying a change in the root cause
402

Updating the root cause of the anomalous event
404

Sending an updated incident ticket to nodes
identified as the updated root cause
of the anomalous event
406

Notifying nodes having an alert corresponding
to the anomalous event when
identifying the updated root cause
408

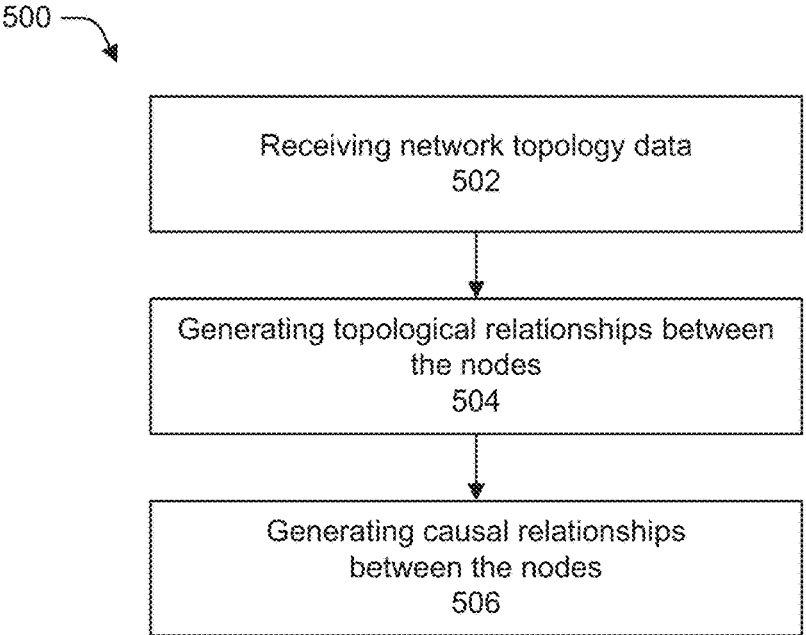

Receiving network topology data
502

Generating topological relationships between
the nodes
504

Generating causal relationships
between the nodes
506

FIG. 5

ROOT CAUSE DETECTION OF ANOMALOUS BEHAVIOR USING NETWORK RELATIONSHIPS AND EVENT CORRELATION

CROSS-REFERENCE TO RELATED APPLICATIONS

This application is a continuation of and claims priority to U.S. application Ser. No. 17/378,084 filed on Jul. 16, 2021 and entitled, "ROOT CAUSE DETECTION OF AN ANOMALOUS BEHAVIOR USING NETWORK RELATIONSHIPS AND EVENT CORRELATION," the entirety of the contents of which are incorporated herein by reference.

BACKGROUND

Localizing the sources or root causes of problems in large networks. e.g., enterprise networks, is extremely challenging. Dependencies are numerous, complex, and inherently multi-level, spanning a across many hardware and software components in the network. Network problems can arise at any level and as a result of any general network component. For example, network problems can be within the core of a network (e.g., routers, links, switches, etc.), with the end hosts of a network (e.g., clients that are primarily used by humans, servers that primarily provide some service or application to clients and/or other servers, etc.), with services of the network (e.g., websites, web services, DNS, etc.), and so forth.

Traditional root cause analysis is performed in a systematic manner with conclusions and root causes supported by evidence and established causal relationships between the root cause(s) and problem(s). Some existing systems detect errors in a process by assuming that a first or last error event that occurs during an analysis window execution of the process is the root cause. However, this approach lacks precision and may produce false alarms (e.g., if the error event is not severe, is only temporary, or if the event self-resolves). Further, it is difficult and time-consuming to trace code paths to understand the reason for each failure.

SUMMARY

This disclosure describes systems, devices, and techniques for determining a root cause of an anomalous event in a network. As anomalous events occur in the network, the resource causing the event sends an alert to a node, such as a server, in the network. The alerts may include metadata or other information about the network, the anomalous event or any other data relevant to the alert. The alerts are correlated with previously detected alerts that occur during a same time period. Based on the correlated alerts, and dependent relationships in the network, a root cause of the anomalous event may be identified. Once a root cause has been identified, an incident ticket may be generated and reported to the person or entity responsible for the root cause of the anomalous event. Other persons or entities in the network may also be notified of the root cause. The process is recursive such that as new alerts and root causes are identified by the server, incident tickets may be updated to reflect any changes.

In one example, the system, device and techniques described herein allow for a configurable multi-cycle correlation and enrichment based on multiple data sources (e.g., configuration, transaction ID, etc.) and key/value pairs. Additionally, configuration and topology data may be correlated to account for multi-tiered relationships between configuration items in a node, including recognition of neighboring relationships that are not a reason to correlate (i.e., false positive avoidance). Moreover, based on the alerts and related dependency chains, machine learning algorithms may determine the probable root cause of the anomalous event and open the incident tickets to the appropriate persons or entities for resolution. The incident tickets may be sent to persons or entities of a node responsible for resolution of the anomalous event, while persons and entities of a node that is affected or impacted by the anomalous event, but otherwise not identified as the root cause, are notified.

In an example of the present disclosure, a method of determining a root cause of anomalous events in a networked computing environment includes detecting an alert corresponding to an anomalous event in the networked computing environment during a time period by a node. The alert is correlated with previously detected alerts occurring within the time period based at least in part on a causal relationship associated with nodes in the networked computing environment, where the alert and the previously detected alerts include a set of correlated alerts. A root cause of the anomalous event detected in the networked computing environment is recursively identified based at least in part on the correlated alerts, and an incident ticket is sent to the nodes in the networked computing environment identified as the root cause of the anomalous event, where the incident ticket include a the correlated alerts. Nodes having a causal relationship with the node identified as the root cause are notified.

In another example of the present disclosure, a system includes one or more processors and one or more non-transitory computer-readable media storing computer-executable instructions that, when executed, cause the one or more processors to perform operations including detecting an alert corresponding to an anomalous event in the networked computing environment during a time period by a node. The alert is correlated with previously detected alerts occurring within the time period based at least in part on a causal relationship associated with nodes in the networked computing environment, where the alert and the previously detected alerts include a set of correlated alerts. A root cause of the anomalous event detected in the networked computing environment is recursively identified based at least in part on the correlated alerts, and an incident ticket is sent to the nodes in the networked computing environment identified as the root cause of the anomalous event, where the incident ticket include a the correlated alerts. Nodes having a causal relationship with the node identified as the root cause are notified.

In still another example of the present disclosure, one or more non-transitory computer-readable media storing instructions that, when executed by one or more processors, cause the one or more processors to perform actions including determining an indirect dependency between nodes in a networked computing environment based on a network topology. The network topology indicates a respective dependency level for each node in the networked computing environment. The alerts correspond to anomalous events and are associated with a first node of the nodes. The first node has an indirect dependency to a second node of the nodes according to the network topology. The alerts are correlated based on at least one of an activity type of the anomalous events and a root cause type of the anomalous events. A likely root cause of an anomalous event is assigned to the first node based at least in part on the first node having a lowest dependency level indicated in the network topology.

An incident ticket is sent to the first node, the incident ticket including the correlated alerts, and a notification is sent to the second node, where the notification indicates an existing performance issue at the first node, and the likely root cause of the anomalous event.

Various implementations of the present disclosure will now be described with reference to the accompanying figures.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 3 illustrates an example flow diagram associated with a process 300 for determining a root cause of anomalous events in the networked computing environment 100 of FIG. 1.

FIG. 4 illustrates a flow diagram associated with a process 400 for updating a root cause of anomalous events identified in process 300 of FIG. 3.

FIG. 5 illustrates a flow diagram associated with a process 500 for generating topological and causal relationships between nodes in process 300 of FIG. 3.

DETAILED DESCRIPTION

Figure 1:
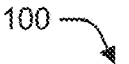
FIG. 1 illustrates an example embodiment of a networked computing environment in which to implement the disclosed technology.

FIG. 1 illustrates an example embodiment of a networked computing environment in which to implement the disclosed technology. Networked computing environment 100 includes monitored computing devices 102, one or more networks 104 and data center 106. In one example embodiment, the networked computing environment 100 is an insurance company network. The computing devices may be interconnected through the network 104. The network 104 allows computing devices and/or storage devices to connect to and communicate with other computing devices 102 and/or other storage devices (not shown). As depicted, the monitored computing devices 102 and a data center 106 are in communication with each other via the network 104.

The data center 106 includes, for example, a server 108 (e.g., an edge server) in communication with a server 110 (e.g., an application server) that is in communication with a storage device 112 (e.g., a network-attached storage device). In example cases, the storage device 112 may comprise a hard disk drive, a magnetic tape drive, or a solid-state drive. In some example embodiments, the networked computing environment 100 may include other computing and/or storage devices not shown. For example, the data center 106 may include thousands of servers and/or data storage devices in communication with each other. The data storage devices may comprise a tiered data storage infrastructure (or a portion of a tiered data storage infrastructure). In some example cases, a tiered data storage infrastructure may include redundant arrays of independent disks and/or storage area networks.

The network 104 may include, for example, a secure network such as an enterprise private network, an unsecure network such as a wireless open network, a local area network (LAN), a wide area network (WAN), and the Internet. The network 104 may include hubs, bridges, routers, switches, and wired transmission media such as a wired network or direct-wired connection. The network 104 may also include an extranet or other private network for securely sharing information or providing controlled access to applications.

The servers, such as server 108, may allow a client to download information (e.g., text, audio, image, and video files) from the server 108 or to perform a search query related to particular information stored on the serve r 108. In some example cases, server 108 may act as a mail server or a file server. In general, a "server" may include a hardware device that acts as the host in a client-server relationship or a software process that shares a resource with or performs work for one or more clients. Communication between monitored computing devices 102 in a client-server relationship may be initiated by a monitored client 102 sending a request to the server 108 asking for access to a particular resource or for particular work to be performed. The server 108 may subsequently perform the actions requested and send a response back to the client 102.

In one example embodiment, the server 108 includes a network interface 114, processor(s) 116, memory 118, database 120, and root cause manager 122 all in communication with each other. The network interface 114 allows server 108 to connect to the network 104. The network interface 114 may include a wireless network interface, a modem, and/or a wired network interface. The processor(s) 116 allows server 108 to execute computer readable instructions stored in memory 118 in order to perform processes discussed herein. In some example cases, the server 108 may establish a secure connection with one or more computing devices 102 (e.g., using a virtual private network connection). The processor(s) 116 may comprise one or more processing elements (e.g., multiple CPUs). In an example embodiment, server 108 may store data in the database 120 or acquire data to be processed from the database 120. The stored data associated with database 120, in one example embodiment, may reside in memory 118.

The networked computing environment 100 may provide a cloud computing environment for one or more computing devices, such as monitored computing devices 102. Cloud computing refers to Internet-based computing, wherein shared resources, software, and/or information are provided to one or more computing devices on-demand via the Internet (or other global networks). The networked computing environment may comprise a cloud computing environment providing Software-as-a-Service (SaaS) or Infrastructure-as-a-Service (Iaas) services. Saas may refer to a software distribution model in which applications are hosted by a service provider and made available to end users over the Internet. The networked computing environment 100 may provide a software service that requires the availability of one or more applications to be operational.

The networked computing environment 100 may also comprise an information technology (IT) infrastructure for providing one or more services. In some example embodiments, a root cause identification tool (or software application), such as root cause manager 122 (FIG. 2), may run on the server 108 while various services are provided by the networked computing environment 100. The root cause manager 122, among other features, may aggregate data from a plurality of IT management software tools that monitor different layers of the IT infrastructure in order to identify a root cause for a performance or availability issue affecting the IT infrastructure. In one example, a service (or software service) provided by the IT infrastructure (e.g., an online service requiring access to a database application and a messaging application to provide the online service) may require the availability of a plurality of applications. The root cause identification tool may detect a performance or availability issue affecting one of the plurality of applications, identify causal relationships associated with the performance or availability issue based on the aggregated data, determine a root cause of the performance or availability issue based on the causal relationships, and report the root cause and possible remedies to the performance or availability issue to an end user of the root cause identification tool based on a role of the end user.

While some embodiments of the disclosure are illustrated and described herein with reference to the monitored computing device 102 and servers 108 and 110, aspects of the disclosure are operable with any device that performs the functionality illustrated and described herein, or its equivalent. For example, embodiments of the disclosure are operable with netbooks, desktop computing devices, laptop computers, and other computing devices. In such embodiments, data may be stored by a cloud service and accessible by any computing device implementing functionality of the disclosure. Further, in some example embodiments, monitored computing device 102, network 104, servers 108 and 110, and database 112 may be located on the same physical machine or grouped in any number of different configurations.

In one example embodiment, the root cause manager 122 is responsible for identifying a root cause of an anomalous event (e.g., a performance or availability issue) affecting the networked computing environment 100, as explained below in further detail. As will become apparent from the discussion that follows, an anomalous event is an event that indicates a network occurrence or condition that deviates from a normal or expected value or outcome. For example, an event may have an attribute value that exceeds or falls below a determined threshold or required value, or an event may indicate that a component shut down or restarted prior to a scheduled time. Additionally, an anomalous event may be an event that indicates a network issue such as a component or application failure.

Figure 2:
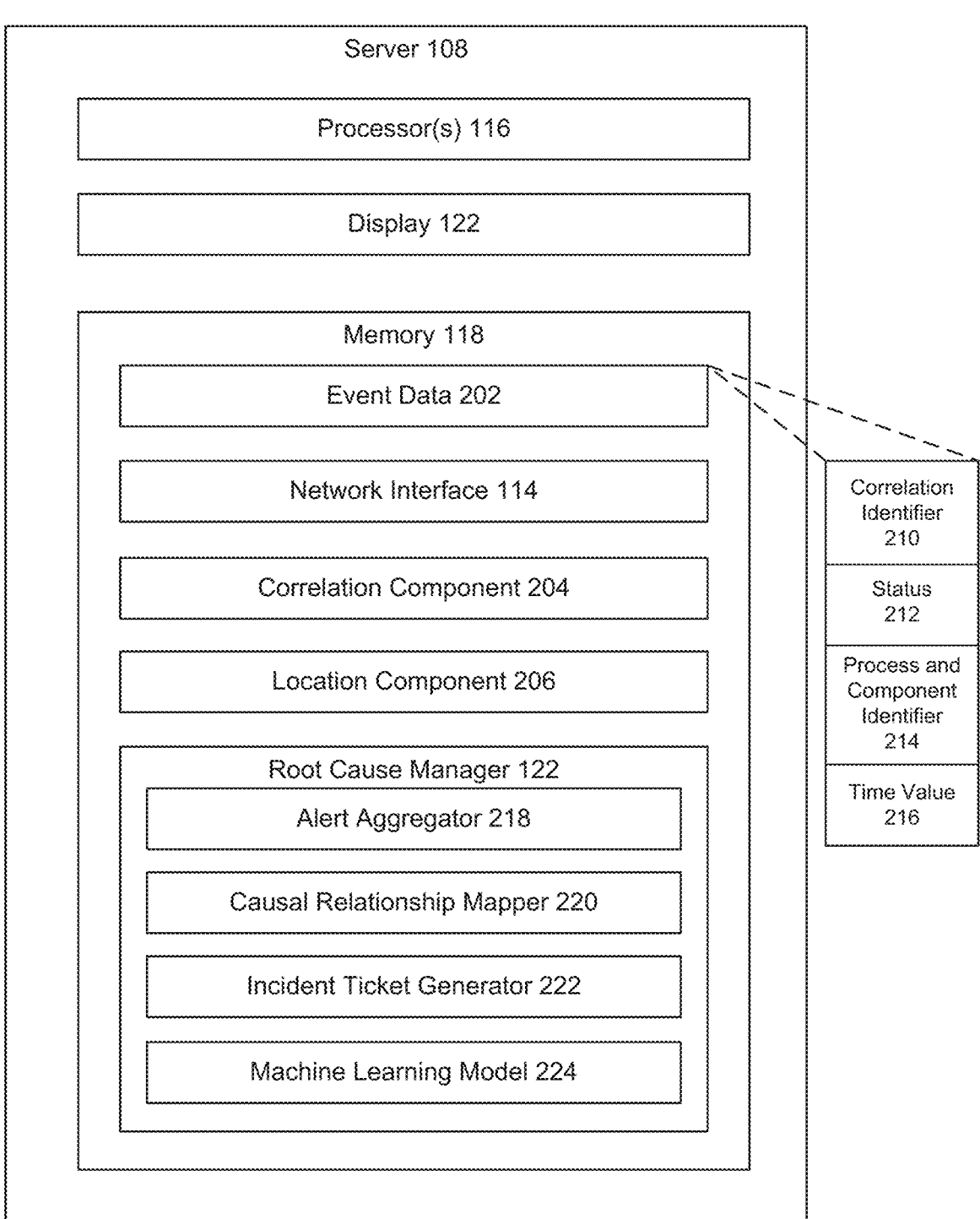
FIG. 2 illustrates a detailed version of the server and monitored computing devices shown in FIG. 1.

FIG. 2 illustrates a detailed version of the server and monitored computing devices shown in FIG. 1. The server 108 includes the processor(s) 116 and the memory 118 as discussed above with reference to FIG. 1. Although not shown, the server 108 may also include network interface 114 and the database 120. The server 108 additionally includes a display 122 (or attached computing device with a display) which may be, for example, a capacitive touch screen display or any kind of interface capable of displaying or recording events that occur on the server 108 or are recorded by the server 108. User input functionality is provided in the display 122 which acts as a user input selection device as well as a means to provide a user with an identity of a root cause activity event.

In one example embodiment, the memory 118 includes a memory area for storing components for automatically identifying a root cause of an anomalous event. The memory 118 stores event data 202, including anomalous event data, and one or more computer-executable components. Exemplary components include, but are not limited to, a network interface component 114, a correlation component 204 and a location component 206. While the event data 202 and components 114, 204 and 206 are shown to be stored in memory 118, the event data 202 and components 114, 204 and 206 may be stored and executed from a memory area remote from the server 108. For example, the event data 202 may be stored in a cloud service, a database, or other memory area accessible by the server 108. Such example embodiments reduce the computational and storage burden on server 108.

Processor(s) 116 executes computer-executable instructions for implementing aspects of the disclosure. In some example embodiments, and in addition to those described above, the processor(s) 116 is transformed into a special purpose microprocessor by executing computer-executable instructions or by otherwise being programmed. For example, the network interface component 114 when executed by the processor(s) 116. causes the processor(s) 116 to receive event data 202. The event data 202 corresponds to a plurality of events (e.g., activity/process start, activity/process finish (failure), activity/process finish (success), and error events).

Event data 202 may include, but is not limited to, a correlation identifier 210 for tracking and correlating events, a status 212 for identifying an event such as "failed"; "succeeded" or "successfully recovered from error", a process and component identifier 214 for associating an event with a particular process or component, and a time value 216 (or timestamp) for determining a chronological order of events as they occur and/or establishing a time period, which may then be used to identify the root cause of an event. In some example embodiments, the monitored computing devices 102 provide the event data 202. In other example embodiments, other devices or application programs provide, calculate, or assign one or more elements of the event data 202.

The correlation component 204, when executed by the processor(s) 116 causes the processor(s) 116 to assign each of the events to an event group based on the correlation identifier 210 of the event. In one example embodiment, the correlation component 204 tags a correlation identifier 210 to a first event (or alert corresponding to the alert) identified as an anomalous event and tags the same correlation identifier 210 to any event identified as an anomalous event as a result of the first event being identified as causing the error. In example embodiments, the correlation identifier 210 assigns each of the events with a same correlation identifier 210 to an event group. For example, a process may have one more event groups that make up the process, with each event group being representative of one more events with the same correlation identifier. Additional example embodiments of the correlation component 204 will be described below with reference to the various embodiments.

The location component 206, when executed the processor(s) 116, causes the processor(s) 116 to identify at least one of the event groups having at least one of the events assigned thereto with a status 212 indicating failure of a process or component identified by the process and component identifier 214 of the at least one event. Thus, an event group with a status indicating a "failure" is reviewed, while an event group with a status indicated as "successful" may be ignored. In one example, event groups with a "successful" resolution status are reviewed between a predefined period of time to determine a number of times each of the event groups have had an anomalous event during the predefined time period and were successfully recovered.

This number may be compared to a threshold number or a threshold percentage to determine if the anomalous event (successfully resolved) is occurring on a frequent enough basis (e.g., execution of a program on a server fails during 95% of attempts over a predefined period of time) to provoke an incident ticket (i.e., a support ticket), trouble-shooting, or further review by a user. In one example, an incident ticket is filed by a user of the system in response to a hardware or software failure (e.g., an application failure, process failure, server failure, etc.). In another example, the incident ticket is automatically generated by the system. It is appreciated that the term "failure" within the context of this disclosure is not limited to a complete failure of software or hardware, but also to partial failure or any type of perfor-mance, problem, error or activity issue with the software or hardware, including applications, components, code, data, etc. associated therewith.

In one example embodiment, events from the event group may be identified as a root cause of an anomalous event based on the amount of times the anomalous event occurs as tracked by the time values 216 of each event. For example, a first event in a process to be identified as an anomalous event is assigned an occurrence time value of "1". There-after, the next event identified as an anomalous event is assigned an occurrence time value of "2" and so on. There-fore, an assumption can be made that the lowest time value in each event group is the root cause of the anomalous event. In some example embodiments, a level of importance of the events may be determined and an incident ticket issued based on the determined level of importance of the events. The level of importance of the events may be based on an event group or activity type or both an event group or activity type and a root cause type. In a further example, the display 122 may present to a user the event data 202 associated with the root cause.

The root cause manager 122, as explained above, is responsible for identifying a root cause of the anomalous event (e.g., a performance or availability issue) affecting the networked computing environment 100. In one example, the root cause manager 122 includes one or more applications to monitor different layers of the networked computing envi-ronment 100. In one example, the root cause manager 122 monitors the performance and availability of services pro-vided by the networked computing environment 100. In an example embodiment, response times experienced by vari-ous end users of a service may be monitored along with the performance of networks associated with the networked computing environment 100. In one example embodiment, the performance of a network connecting an end user device (e.g., a mobile device or workstation) with an application server is monitored, along with response times and avail-ability of devices connected to the network. Bandwidth utilization and latency across the various components of the network may also be tracked and monitored. The perfor-mance of applications provided by the networked computing environment 100 may also be monitored. In one example embodiment, a status history associated with a particular application (e.g., whether the particular application is run-ning, halted, or non-responsive), the volume of transactions processed by the particular application over time, the response times of the particular application over various load conditions (e.g., average response times under a peak load). and the computing and storage resources consumed by the particular application over time (e.g., the memory footprint) are monitored.

In some example embodiments, the root cause manager 122 may monitor the performance of a monitored computing device 102 running a particular application or process (e.g., Process#1 . . . Process#N). In one example embodiment, the root cause manager 122 may monitor processor(s) 116 performance, core performance, and physical memory usage. The root cause manager 122 may also monitor the performance of a storage device connected to a network, such as database 112 or 120. In one example embodiment, the root cause manager 122 may monitor disk usage and disk access times for the storage device over time and whether power is connected to a particular device (e.g., electrical power is connected to a particular device or storage). The root cause manager 122 may also monitor whether power is connected to specific servers, storage devices, switches, and other data center components. Temperatures associated with a room, a server rack, physical servers, and storage devices may be monitored by the root cause manager 122. For example, the server 108 may monitor the data center com-ponents to determine if the temperature of a hardware component or device is not within a desired range or if the temperature is not able to be regulated. As a result of monitoring, the server 108 may send an alert indicating that hardware component temperature is outside of the desired range.

The root cause manager 108 includes an alert aggregator 218, a causal relationship mapper 220, an incident ticket generator 222 and a machine learning model 224. In one example embodiment, the root cause manager 122 may include an application running on a server, such as server 108. The alert aggregator 218 may acquire data from the network and aggregate the data. The aggregated data may include alarms or alerts generated by the components and applications being monitored, as well as log files generated by devices being monitored. The alert aggregator 218 may aggregate data upon detection of a particular event (e.g., upon detection of an application failure) or may aggregate data periodically (e.g., every 5 minutes) and store the aggregated data in storage, such as database 112 or 120. The causal relationship mapper 220 may map the alerts to nodes in a causal relationship graph. The alerts may be associated with a description of the underlying failure detected and a timestamp or time value for when the underlying failure occurred. In one example embodiment, the alerts are enriched with metadata (e.g., information about the network, resources, components, applications, etc.).

In one example embodiment, nodes in a causal relation-ship graph (not shown) may correspond with an individual alert or a collection of alerts aggregated by the alert aggre-gator 218. In another example embodiment, each node in the causal relationship graph may correspond with a particular type of alert at a particular level in a networked computing environment hierarchy (e.g., CPU utilization alerts associ-ated with a particular server or application performance alerts associated with a particular application). In some example cases, a causal relationship graph may be generated for each alert generated. The causal relationship graph may include directed edges with a causal relationship between pairs of nodes in the graph. A directed edge in the graph may represent that a first failure is a direct consequence of another failure. For example, the first failure may corre-spond with a first node (e.g., a first component) in the graph with a directed edge to a second node (e.g., a second component) in the graph corresponding with a second failure that is a direct consequence of the first failure. In this case, the directed edge represents a causal relationship between the first failure and the second failure. In one example embodiment, the graph may be a directed acyclic graph (DAC). In another example embodiment, the graph may be a Bayesian network with causal relationship probabilities assigned to each of the directed edges. The causal relationship probabilities may be stored, for example, in database 112 or 120. In this case, the structure of the graph and the assigned probabilities may be learned from the aggregated data. In one further example, the graph structure of the Bayesian network may be determined using machine learning techniques based on the aggregated data and changes in the aggregated data over time (e.g., the aggregated data stored in the database may be used as training data for learning the causal relationships between the nodes over time). Additional example embodiments are discussed below.

The causal relationship mapper 220 may also identify a chain of failures beginning from a first node in the failure graph (e.g., a leaf node) and ending at a root node of the graph. The root node of the graph may correspond with the highest-level alert and the leaf nodes of the graph may correspond with root causes of the highest-level alert. The leaf nodes may comprise nodes without any predecessor nodes or nodes without any incoming directed edges from another node in the graph. A chain of failures may comprise a set of nodes along a path from a leaf node in the graph to the root node of the graph. In one example embodiment, the causal relationship mapper 220 may identify a particular chain of failures based on a number of alerts that are a consequence of the leaf node of the particular chain of failures. For example, the particular chain of failures may include a leaf node in which fixing the failure associated with the leaf node will fix the greatest number of unresolved alerts.

The incident ticket generator 222 may generate and transmit a report to a user of the report based on an identified chain of failures. In one example embodiment, the incident ticket generator 222 may identify a role associated with a user and output an incident report or ticket to the user based on the user's role. For example, the role of the user may be determined based on a username, an employee identification number, or an email address associated with the user. In one example, a person with a technical role within an insurance organization may receive a report with technical information (e.g., server utilization information), while a person with a non-technical role within the insurance organization may receive a report with business-focused information (e.g., the number of people who can currently connect to a particular application or the estimated downtime for the particular application).

In some example embodiments, the server 108 may generate a first alert based on an error coming from an application server (e.g., that a database application is not responsive or that the application server cannot connect to the database), such as server 110. In response to the first alert, the root cause manager 122 may identify causally related alerts generated by the sever 108. In one example, close to the time at which the first alert from server 110 was generated, the root cause manager 122 may identify a second alert. For example, an alert may be generated that a particular network switch malfunctioned and the root cause manager 122 may determine whether the first alert is a direct consequence of the second alert (i.e., that the failure of the particular network switch would cause the error coming from the application server). In some cases, the failure of the particular network switch may be caused by a hardware-related issue (e.g., due to a power failure or a physical connection issue) or software-related issue (e.g., the particular network switch was overloaded with too many connections). If the first alert is determined to be a direct consequence of the second alert, then the root cause manager 122 may attempt to identify a third alert that is the cause of the second alert. If a third alert is not identified, then the second alert may be outputted as the root cause of the error coming from the application server. Further examples are provided below.

In some example embodiments, the root cause manager 122 may aggregate data from one or more IT management software tools periodically or in response to a service-level performance issue being detected (e.g., a service is no longer available to an end user of the service). The aggregated data may include service-level data related to a service provided by the networked computing environment 100, such as the availability of the service and response times associated with the service. The service may require applications to be available (e.g., an online personal information manager may require a word processing application, an email application, and a database application to be available). The aggregated data may include application-level data related to the applications, such as a status of each of the applications (e.g., currently running, halted, or terminated) and an identification of a first set of servers which are running the applications. The aggregated data may include networking-level data associated with networks connected to the first set of servers, such as the resources available in the network and network utilization metrics. The aggregated data may include virtualization-level data associated with the performance of virtual machines on which applications are running. The aggregated data may include device-level data associated with device level performance metrics (e.g., computing device utilization or storage device utilization). From the aggregated data corresponding with the different perspectives offered by the IT management software tools, the root cause manager 122 may determine causal relationships between failures occurring at different layers within a hierarchy (e.g., represented as directed edges between failed nodes in a directed acyclic graph) and identify a root cause of a service-level performance issue based on the causal relationships.

FIG. 3 is an example flow diagram illustrating a process 300 for determining a root cause of anomalous events in the networked computing environment 100 of FIG. 1. In the discussion that follows, the server 108 performs the process 300. However, it is appreciated that any other functional unit or processing unit may implement the processes described herein, and the disclosure is not limited to implementation by the server 108.

At operation 302, the server collects data for events occurring at one or more nodes in the networked computing environment 100. In one example embodiment, the data for the events is collected during a time period. For example, the time period may be a predefined time period, a randomly selected time period, a variable time period, or the like. In one example, one or more of the events collected by the server 108 is an anomalous event. As defined above, an anomalous event is an event that indicates a network occurrence or condition that deviates from a normal or expected value or outcome. For example, an event may have an attribute value that exceeds or falls below a determined threshold or required value, or an event may indicate that a component shut down or restarted prior to a scheduled time. Additionally, an anomalous event may be an event that indicates a network issue such as a component or application failure.

At operation 304, the server 108 detects alerts that correspond to an anomalous event. As part of the detecting process, the server 108 monitors nodes (e.g., servers, computing devices, peripheral devices, etc.) in the networked computing environment 100 to identify alerts in response to an occurrence of an anomalous event. For example, the sever 108 may monitor the networked computing environment 100 for alert messages. The alert messages may be generated by one or more nodes in response to errors (e.g., communication errors, etc.) encountered by the nodes. For example, the node may have a sensor to monitor incoming and outgoing communications. When one or more alerts are detected or received from the nodes at the server 108, the alerts may be correlated at operation 306. In one other example embodiment, the server 108 may monitor or observe alerts along data paths in the networked computing environment 100. Any detected alerts may be stored in memory 118 or database 120. In one embodiment, the alerts may be stored with a timestamp or time value and information about the component or application and resource associated with the detected alert. The information may be gleaned, for example, by rules defined to monitor various resources within the networked computing environment 100 and to capture information relating to performance and other issues for those resources. In one example embodiment, the alerts may be grouped or organized into historical alerts for later use and retrieval. For example, the historical alerts may be used as input into a machine learning model in which to assist in categorizing future alerts as they are detected in the system.

At operation 306, the correlation component 204 retrieves and correlates alerts and corresponding events in the database, such as database 112 or 120. In one embodiment, the alerts and corresponding events are correlated as they are collected from the system. In either case, correlation of alerts and corresponding events refers to the identification of a relationship or statistical connection between two or more alerts or events. Events, and corresponding alerts, can be correlated based on a determination that a first event caused a second event, that a first series of events caused a second series of events, that two events often occur near simultaneously, etc. The correlation component 204 can also correlate the alerts and events based on a statistical, causal, or probability analysis, etc. The correlation component 204 can also correlate alerts and events based on sequence mining or identification of repetitive event patterns (i.e., temporally sequential series of events), as understood by the skilled artisan. For example, the correlation component 204 may determine that there is a correlation between a first event in which an application invokes storage in the database and a second event which occurs a minute later and indicates a slow response time at the database. The correlation component 204 can validate correlations over multiple time periods. For example, the correlation component 204 may increase a correlation probability based on identifying a pattern in past events indicating that an event with a slow response time for the database frequently occurs after events indicating invocations of the correlation component 204 by a same application.

At operation 308, a root cause of the anomalous events associated with the alerts is recursively identified by the root cause manager 122 of the server 108. In one example embodiment, the recursive identification of the root cause is during a specified time period and/or is based at least in part on correlated alerts. A root cause represents an underlying failure that is associated with one or more monitored network events in which a component, application, etc. has failed or caused an error. The detected events may be considered symptoms of the root cause. For example, network monitoring may generate signals or alerts indicating that some number of routers or links has gone down. The underlying failure, or root cause, associated with these symptoms may be a networking cable or optical fiber in a data center that was inadvertently cut or otherwise became inoperable subsequently causing the routers and router interfaces to fail.

In one example embodiment, the root cause manager 122 of the server 108 performs root cause analysis using service domains of components in the networked computing environment 100 and events in the database 112 and 120. The root cause manager 122 may monitor the database 112 and 120 to identify one or more anomalous events occurring at the components. For example, an event may have an attribute value that exceeds or falls below a determined threshold or required value, or an event may indicate that a component shut down or restarted prior to a scheduled time. Additionally, an anomalous event may be an event that indicates a network issue such as a component or application failure.

After identifying one or more anomalous events, in one example, the root cause manager 122 identifies the service domains that include components corresponding to the anomalous events. The root cause manager 122 then utilizes the identified service domain(s) to aid in the root cause analysis process. For example, if an anomalous event, such as a slow response time, occurred at an application, the root cause manager 122 identifies the service domain in which the component executing the application is located. The root cause manager 122 then identifies the related components in the service domain and retrieves events for those components from the database 112 and 120. In one further example, the root cause manager 122 identifies an anomalous event occurring at a lowest layer component in the service domain and outputs that event as the root cause. For example, if a high processor load event was occurring in a hypervisor, which for purposes of discussion is a lower layer component than the application, the root cause manager 122 prioritizes the high processor load event as the root cause and outputs that event as the root cause. In still another example, the root cause manager 122 may utilize an event sequence or pattern in the service domain to identify which component typically starts the series of events resulting in an anomaly. If the event sequence is typically instigated by, for example, an application, the root cause manager 122 outputs an alert that the application is the root cause. The root cause manager 122 may also output related events which occur at other components in the service domain. For example, the related events may be hidden or suppressed so that an administrator is not overwhelmed with alerts or notifications of anomalous events or other possible root causes. In one example embodiment, the root cause manager 122 suppresses events generated by the components in the service domain while an issue causing the anomalous events is still occurring. Once the issue has been resolved and the components are functioning properly, the root cause manager 122 resumes normal generation of event notifications.

In a further example embodiment, the root cause of the anomalous event is determined using a machine learning model. In this case, the machine learning model models the causal relationship between the root cause and the anomalous event corresponding to the node and the topological relationships. For example, a machine learning model may infer the root cause of a detected anomalous event using a trained network, such as a Bayesian network. The machine learning model may be trained, for example, using sample or training data sets that train the model to perform processes associated with recursively identifying the root cause of anomalous behavior. In one example embodiment, once the model (or network) is trained, machine learning may include performing pattern recognition on event data or event data sets collected by the server 108 during a specified time period. For example, the pattern may be a review for pattern or sequence labels for insurance claims. Machine learning uses algorithms that can learn from and make predictions on data. Such algorithms operate using a model. such as from sample inputs, in order to make data-driven predictions or decisions, rather than strictly using static program instructions. Machine learning may be performed using data stored in databases, such as databases 112 and 120. This data may then be accumulated. and machine learning may be performed on the data, including supervised and unsupervised learning. This learning may include processing using clustering, associating, regression analysis, and classifying in a processor. The processed data may then be analyzed and reported.

Once a root cause of the anomalous event has been identified, an incident (or support) ticket generated by the incident ticket generator 220 may be sent to the nodes identified as the root cause of the anomalous event, at operation 310. In another example embodiment, the incident ticket is sent to a user of the generated incident ticket, such as an administrator of the network or a technical advisor, such as an IT manager, or the person or entity responsible for handling incident tickets. The incident ticket may be generated to advise a party (e.g., the administrator) of a failure associated with the network. For example, the incident ticket may specify that a particular application is not available along with a description of the alerts associated with the failed application, which may also include any causal graph previously generated by the server 108. In response to receiving the incident ticket reporting the anomalous event, the appropriate person or entity may proactively investigate the anomalous event and identify the particular root cause of the anomalous event. Subsequent to identifying one or more root causes of the detected anomaly condition, the appropriate person(s) or entity(ies) associates the detected anomalous event to the resource causing the failure or error. Additionally, the appropriate person(s) or entity(ies) associates the detected anomalous event to corresponding corrective action required to fix the underlying root cause(s) associated with the resource failure or error.

At operation 312, a set of nodes are notified of the root cause. In one embodiment, the nodes in the set have a causal relationship with the node identified as the root cause. That is, components in the network that may be related to, but are not necessarily, the root cause of the anomalous event are notified. In one example embodiment, the notification is sent to the appropriate person on entity responsible for receiving communications from the server 108. While the nodes are notified of the anomalous behavior, the nodes may not receive the incident ticket. This reduces the likelihood of a person or entity at the node from reviewing the notification and performing actions to resolve the root cause for a component not responsible for the anomalous behavior. In this regard, any overlap of multiple persons or entities at the nodes actively identifying and resolving the root cause will be reduced.

At operation 314, the root cause of the anomalous event is resolved. For example, the node may automatically resolve the anomalous event based on the incident report, or a person or entity may identify the specific root cause based on the incident report. In one example, other nodes in the network may be notified of the resolution.

FIG. 4 illustrates a flow diagram associated with a process 400 for updating a root cause of anomalous events identified in process 300 of FIG. 3. In the discussion that follows, the server 108 performs the process 400. However, it is appreciated that any other functional unit or processing unit may implement the processes described herein, and the disclosure is not limited to implementation by the server 108.

As part of the recursive process of operation 308 (FIG. 3), the server 108 monitors the networked computing environment 100 to identify any changes in the root cause. As changes occur, the server 108 may update the root cause of the anomalous event and generate new events and alerts, at operation 404. In one example embodiment, the recursive process continues during a specified time period. As new events and alerts are identified by the server 108, the root cause of the anomalous event associated with the alerts may change. For example, the root cause manager 122 may initially detect a first anomalous event that corresponds to a failure of a first component in the networked computing environment 100, which may be assigned a correlation identifier "X" and a time value of "1" since the first anomalous event is the first detected "error" event. The first anomalous event may then be stored, for example, in database 120. As the server 108 continues to monitor the network, a second anomalous event may be detected. This second anomalous event may correspond to a failed second component that affects the first component (e.g., a causal relationship exists between the first and second components), and is assigned the same correlation identifier "X" (e.g., since the error in the second component is related to the error in the first component) and a time value of "2" (e.g., since this is the second occurrence of an anomalous event). Upon identification of the second anomalous event, the server 108 may update the database 120 to reflect that the failed second component caused the failed first component and is the likely root cause of the anomalous event. Additional examples are provided below with reference to FIG. 6.

At operation 406, an updated incident ticket may be sent to the nodes in the network that identifies the updated root cause of the anomalous event, similar to operation 310 described above. In one example embodiment, the updated ticket is sent to the person(s) or entity(ies) responsible for handling the incident ticket.

At operation 408, and similar to operation 312 above, the nodes having an alert corresponding to the anomalous event are notified. That is, components in the network that may be related to, but are not necessarily, the updated root cause of the anomalous event are notified. While the nodes are notified of the anomalous behavior, the nodes do not receive the updated incident ticket. In one example embodiment, the notification is sent to the appropriate person on entity responsible for receiving communications from the server 108.

FIG. 5 illustrates a flow diagram associated with a process 500 for generating topological and causal relationships between nodes in process 300 of FIG. 3. In the discussion that follows, the server 108 performs the process 500. However, it is appreciated that any other functional unit or processing unit may implement the processes described herein, and the disclosure is not limited to implementation by the server 108.

At operation 502, the server 108 receives network topology data. In one example, the network topology data may be stored for example in a database, such as database 112 or 120. The received network topology data may include topology information for networked computing environment 100 to be evaluated for anomalous behavior and root causes. The network topology data may identify the network entities or nodes within the network and the links connecting the identified network entities or nodes for all layers of the network. In one example, the network topology data may be received from one or more sources that are located external to server 108.

From the network topology data, the server 108 may generate a topological graph that represents relationships between network components and applications, at operation 504. The topological relationships may be stored, for example, in memory or a database. Information regarding the identified entities, their behavior, and the topology of the network is captured and organized in the form of a topological relationship graph. For example, in some cases the topological relationship graph may include multiple nodes representing the identified entities. The graph may further include edges connecting the nodes representing interaction between the entities. In some embodiments, the edges can include directionality (e.g., in the form of an arrow pointing to one of two nodes) that indicates the normal flow of activity between the two nodes. For example, the topological relationship graph may contain directional edges indicating normal activity between client to server, server to client, server to server, client to client, etc. In some examples, the topological relationship graph may identify the nodes as neighboring. In one example embodiment, the generated topological relationship graph can be monitored for changes to detect anomalies. For example, in an embodiment, anomalies are detected when the directionality of an edge connecting two nodes in the graph shifts (e.g., reverses) indicating an abnormal flow of activity.

The server 108 may also generate a causal relationship graph of the system at operation 506. In the context of a causal relationship graph, causality is the relationship between a cause and an effect (e.g., a server temperature exceeds a threshold temperature and the server fails). The causality relationship graph may include nodes that represent the system components and directed edges that represent causality relationships between the nodes. The structure of the graph may be, for example, a dependency graph containing resource dependency characteristics of an application. In some example embodiments, the causal relationship graph may be a directed acyclic graph (DAG) in which the vertices of the DAG correspond with variables and the edges of the DAG correspond with whether there is a direct causal relationship between two of the variables. The dependency graph may be, for example, expressed as an XML file that highlights the relationships and dependencies between different components. In one example embodiment, the causal relationship graph may be used to find or assist in finding a root cause of anomalous events that occur in the networked computing environment 100. In still another example, a neighboring pair of the nodes as identified by the topological relationships does not automatically infer the causal relationship. That is, simply because two nodes are neighboring does not automatically identify the two nodes as having a causal relationship.

In one example, the causal relationship mapper 220 of server 108 monitors the nodes and edges in the networked computing environment 100 for anomalous behavior. The causal relationship mapper 220 may search for the cause of an anomaly by utilizing the causal relationship graph. For example, the cause determination may be performed by traversing the graph in reverse order from the node in which an outlier was detected and analyzing components along the path. The root cause may correspond, for example, to the "lowest" node in the hierarchy to show anomalous behavior.

In another example embodiment, the causality relationship mapper 220 of server 108 computes and tracks causal relationship of occurrences of events in the network through analysis of network traffic. For example, in one embodiment, the causality relationship manager 220 may be allocated to track connections between monitored computing devices 102 and/or application servers 108 and 110, their connection types, and the quantity of data transferred. In an example embodiment, the causality relationship manager 220 may use weights or a confidence score assigned to the directed edges of the causality graph to determine the cause of the anomalous event. For example, if a first component fails, the causality relationship manager 220 may infer that a second component is the cause of the problem based on the weight or confidence score assigned to the directed edge between the first component and the second component. Accordingly, the second component can be tested to determine if the inference is accurate. If it is determined that the second component is not the cause of the problem, then the causality relationship manager 220 may infer that a third component, with a weight or confidence score assigned to the directed edge between the second component and the third component, is the cause of the problem, and so on. Thus, using the causality relationship graph, the root cause of the failure of the first component can be correctly identified.

In some examples, the causality relationship mapper 220 can identify a relationship between entities involved in an event based on the actions that are performed by one entity with respect to another entity. For example, the causality relationship mapper 220 can identify a relationship based on comparing the action with a table of identifiable relationships stored in a database. Possible relationships can include, for example, "connects to," "uses," "runs on," "visits," "uploads," "downloads," "successfully logs onto," "restarts," "shuts down," "unsuccessfully attempts to log onto," "attacks," and "infects." Also, the identified relationship between the entities can be indicative of the action, meaning that the identifiable relationship can include the action and also any suitable inference that can be made from the action. For example, an event in which a first monitored computing device 102 requests a web page (action) from a second monitored computing device 102 may indicate that the first and second monitored computing devices have a relationship in which the first monitored computing device "visits" the second monitored computing device. In one example embodiment, the number of identifiable relationships can be directly correlated to the size of the causal relationship graph.

In one example embodiment, the causal relationships between nodes is based on one or more of the root cause and the anomalous event corresponding to the nodes and the topological relationships observed in operation 504. In another example embodiment, a machine learning model models the relationships between root causes and one or more observed anomalous events that are associated with one or more network nodes of entities. In still another embodiment, the causal relationship is indicative of a degree to which a pair of nodes affect one another.

Figure 6:
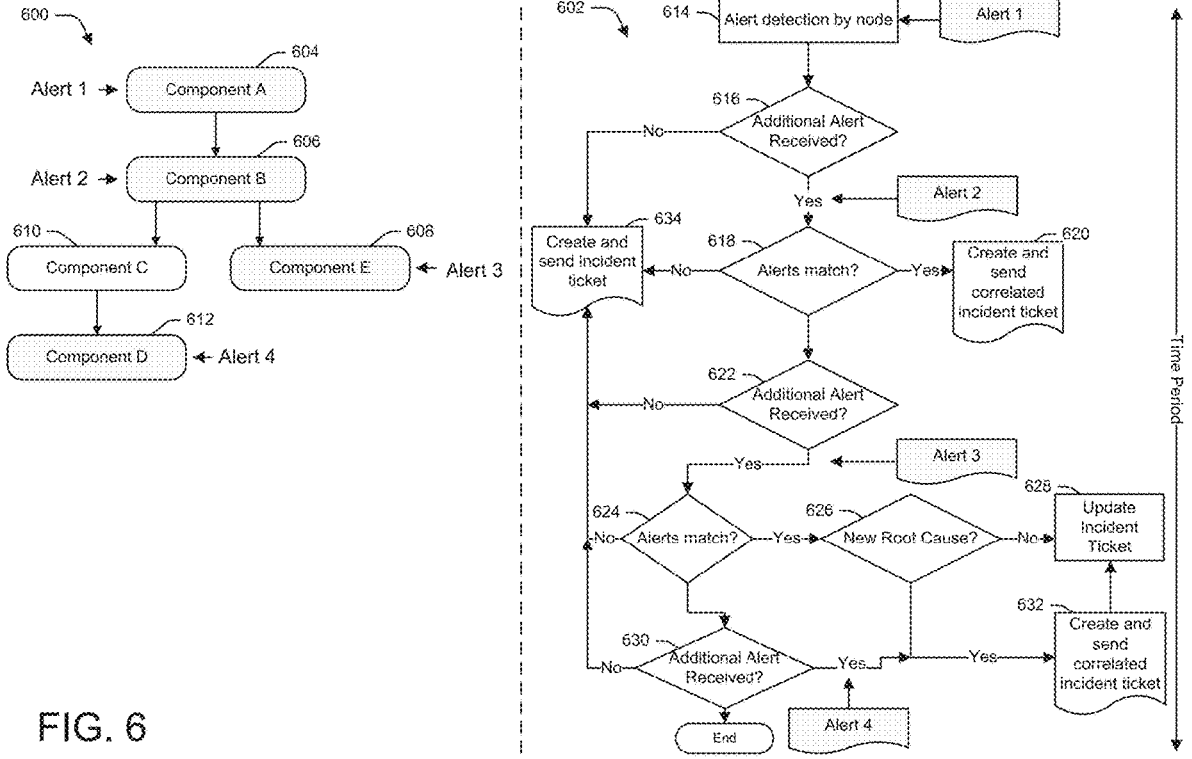
FIG. 6 illustrates a topological relationship graph 600 and a flow diagram associated with a process 602 for detecting and correlating alerts and generating incident tickets.

FIG. 6 illustrates a topological relationship graph 600 and a flow diagram illustrating a process 602 for detecting and correlating alerts and generating incident tickets. In the discussion that follows, the server 108 performs the process 602. However, it is appreciated that any other functional unit or processing unit may implement the processes described herein, and the disclosure is not limited to implementation by the server 108.

As shown, the topological relationship graph 600 is a graph that reflects dependencies within a network. For example, the graph 600 shows dependencies among components 604-612 of a network, such as the networked computing environment 100. The components of the network include software (e.g., an application) and hardware components (e.g., a server), and the topological relationship graph 600 reflects cross-layer components including the services and the hardware components. The topological relationship graph 600 is generated using the received network topology data (operation 502) and the graph 600 shows inter-connections (e.g., graph edges) that exist in or between layers of the network associated with the entities (e.g., nodes) identified in the network topology data and used to correct the root causes of network failures in the networked computing environment 100. The graph 600 may also include sets of network entities and directional mapping between any pair of network entities.

In the process 602, detected alerts are correlated and incident tickets are generated for anomalous behavior. The process 602 will now be described with reference to the topological relationship graph 600 in which component "A" 604, component "B" 606, component "E" 608 and component "D" 612 cause an alert to be received by the server 108. In the example, component "C" 610 does not cause an alert but is part of the topological relationship graph 600. It is appreciated that example discussed is for purposes of discussion and a non-limiting example.

At operation 614, the server 108 detects an alert ("Alert 1") that has been generated by component "A" 604. The alert may be detected, for example, by a sensor at the component "A" 604 that monitors the component for a variety of factors. For example, the sensor may measure a temperature of the component. In the example, if the temperature rises above a threshold, the sensor issues an alert to the server 108. Temperatures above the threshold amount may indicate that the component has failed or is about to fail. Thus, the alert detected by the server 108 is in response to the occurrence of an anomalous event (e.g., server failure or potential server failure) that is related to the component in the networked computing environment 100. In one example embodiment, and upon detection by the server 108, the alert ("Alert 1") may be stored in a database as corresponding to component "A" 604.

The server 108 continues to monitor the network for additional alerts at operation 616. In one example embodiment, the server 108 continues to monitor the network for anomalous behavior during a time period. For example, the sever 108 may monitor the network for alerts detected during a time period equal to 10 minutes, 1 day or 1 week, etc. In one example, alerts detected during the same time period may be tagged or marked to associate the alert with the time period. As explained above, the detected alert may also be tagged or marked such that it corresponds to the component (e.g., component "A" 604) causing the alert and anomalous behavior. In one example, the alert may be tagged or marked with one or more of an activity type (e.g., memory access, data operation, etc.) and a root cause failure type (e.g., application frozen, server down, data problem, etc.). The detected alert may also be tagged or marked with other information, such as metadata or descriptive information about the alert and the cause of the anomalous behavior. In another example embodiment, if the time period expires, the server 108 may stop further monitoring and the process 602 ends or the server 108 may begin to monitor the network during another time period.

In example, if the server 108 does not detect any additional alerts during the time period, a standard incident ticket is created and sent to the person or entity responsible for handling resolution of the alert, at operation 634, a described above. A standard incident ticket, as used herein, is an incident ticket in which no additional alerts (and thus no correlation) or new root causes have been detected during the current detection period. In one example, a notification may also be sent to other persons and entities related to the alert, but that are not determined to be a direct root cause as reported in the incident ticket. If another alert (e.g., "Alert 2") is detected by the server 108 at operation 616, then process 602 proceeds to operation 618. As shown in the example, the detected alert corresponds to "Alert 2" generated at component "B" 606 of the topological relationship graph 600. At operation 618, the server 108 checks to determine whether the previously detected alerts (in this case, "Alert 1") and the newly detected alert (in this case, "Alert 2") match. In one example, the alerts match if the root cause of the failure is the same (e.g., the same resource in the first and second alerts is causing the anomalous behavior). In another example, the alerts are correlated if values (e.g., device name, time range, application name, etc.) contained in the alerts match. In still another example, alerts may be matched using the correlation identifier 210. For example, the correlation identifier 210 is created the first time an alert occurs and is attached to the alert (or to the event causing the alert). The correlation identifier 210 may be "tagged" to the first event that produces the alert. Thereafter, as additional alerts (or the events causing the alerts) produce an error (e.g., anomalous behavior) as a result of the first alert are tagged with the same correlation identifier 210 as the first alert. Alerts that have the same correlation identifier 210 arc considered to be "matched." Matched alerts may then be correlated by the correlation component 204, as described above. At operation 620, an incident ticket is created with the correlated alerts and the incident ticket is sent to the person or entity responsible for handling resolution of the alert. A notification may also be sent to the person or entity having alerts corresponding to the incident ticket, but not directly responsible for the root cause itself.

The process 602 continues to operation 622, where the server 108 continues to monitor the system for additional alerts. In one example, the server 108 matches alerts and monitors for additional alerts in parallel. If the server 108 does not detect any additional alerts during the time period, and similar to the preceding operations, a standard incident ticket is created and sent to the person or entity responsible for handling resolution of the alert, at operation 634. If the server 108 detects additional alerts at operation 622 (such as "Alert 3" from component "E" 608), the server 108 determines whether the alert matches previously received alerts (e.g., "Alert 1" and "Alert 2") at operation 624, as discussed above. If the server 108 does not detect that "Alert 3" matches the previously detected alerts during the time period, a standard incident ticket is created and sent to the person or entity responsible for handling resolution of the alert, at operation 634. If a match is detected by the server 108 at operation 624, the server 108 will evaluate the detected alert (e.g., "Alert 3") to determine whether a new root cause has been identified based on the detected alert, at operation 626. New root causes may be detected as explained above with reference to the root cause manager 122. In one example, if a new root cause is not detected by the server 108 at operation 626, then the incident ticket stored in the database, such as database 112 or 120, may be updated to reflect the newly detected and correlated alerts. If a new root cause is detected by the server 108 at operation 626, an updated incident ticket is created with the correlated alerts and the updated incident ticket is sent to the person or entity responsible for handling resolution of the root cause at operation 632. Additionally, a notification may also be sent to the person or entity having alerts corresponding to the incident ticket, but not directly responsible for the root cause itself. The database 112 or 120 may also be updated to reflect the new root cause and the updated incident ticket at operation 628.

The server 108 will also continue to monitor the network for additional alerts at operation 630, such as "Alert 4." If no additional alert is detected at operation 630, a standard incident ticket may be generated and sent to the appropriate persons and entities to handle the reported incident, at operation 634. If the alert is detected by the server 108 at operation 630, an incident ticket is created and sent to the person or entity responsible for handling resolution of the alert, at operation 632, and the database 112 or 120 may be updated to reflect the newly detected alert at operation 628. In one example embodiment, the monitoring at operation 630 may occur in parallel (i.e., simultaneously or nearly simultaneously) with the determination of a new root cause at operation 626. The process 602 repeats until the expiration of the time period. At the expiration of the time period, the process 602 may end or another process 602 may begin during another time period.

In one example embodiment, the root cause of an anomalous event may be uncertain—e.g., a root cause may be identified but the likelihood of another root cause existing is probable. For example, and with reference to the topological relationship graph 600, suppose for purposes of discussion that component "A" 604 and component "E" 608 generate alerts related to an anomalous event. The server 108 will initially determine the indirect dependency between component "A" 604 and component "E" 608 and correlate any alerts that are detected. If the server 108 determines that the root cause of an anomalous event is component "E" 608, for example since it is the lowest dependent component in the topological relationship graph 600, an incident ticket will be generated and sent to the persons or entities responsible for handling the root cause of component "E" 608. A notification may also be sent to the persons or entities of component "A" 604 informing them that a performance issue exists within the dependency chain, and that component "E" is a potential root cause of the anomalous event. If, for example, the persons or entities handling resolution of the anomalous event for component "E" 608 determine that component "E" 608 is not the root cause of the anomalous event, the alert may be automatically or manually adjusted, and an updated incident ticket and notification may be sent to component "A" 604 informing them that the root cause has been updated to component "A" 604.

With an ability to correlate alerts, incident tickets and troubleshooting can be provided more effectively to minimize the number of incident tickets issued and time spent troubleshooting thus reducing cost. Moreover, the system sends incident tickets to persons or entities that have been identified as having systems and components responsible for the root cause of an anomalous event, but notifying those persons and entities impacted by the anomalous event but not otherwise responsible for the anomalous event itself. Thus, persons and entities receiving a notification, but not an incident ticket, become aware of the network issues but are not otherwise consumed with attempting to resolve the network issue, thereby saving time and cost.

Figure 7:
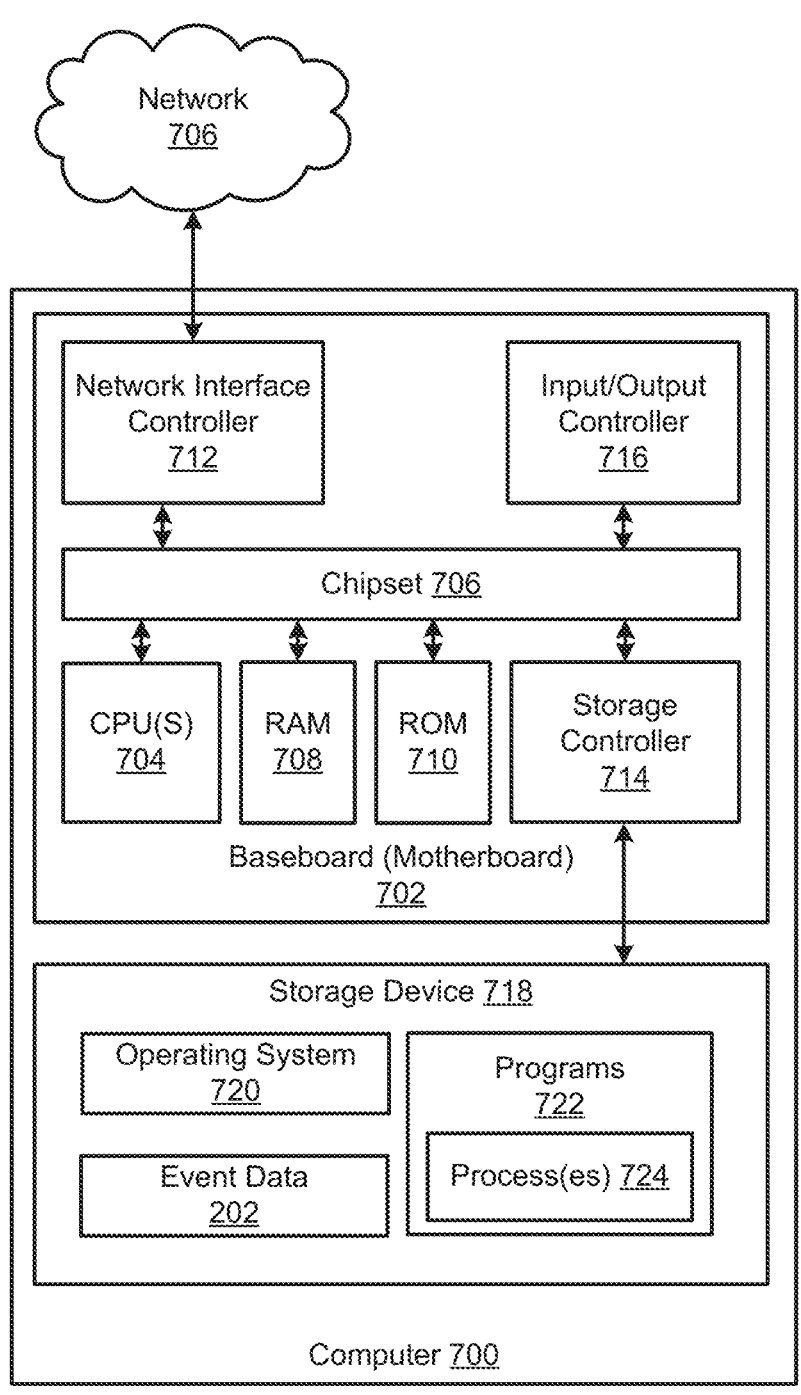
FIG. 7 shows an example computer architecture for a computer 700 capable of executing program components for implementing the functionality described herein.

FIG. 7 shows an example computer architecture for a computer 700 capable of executing program components for implementing the functionality described herein. The computer architecture shown in FIG. 7 illustrates a conventional server computer, workstation, desktop computer, laptop, tablet, network appliance, e-reader, smartphone, or other computing device, and can be utilized to execute any of the software components presented herein. The server computer 700 may, in some examples, correspond to a server or monitored computing device, such as the server 108 or monitored computing device 102 described herein.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as the network 708. The chipset 706 can include functionality for providing network connectivity through a Network Interface Controller (NIC) 1012, such as a gigabit Ethernet adapter. The NIC 712 is capable of connecting the computer 700 to other computing devices over the network 708. It should be appreciated that multiple NICs 712 can be present in the computer 700, connecting the computer to other types of networks and remote computer systems. In some instances, the NICs 712 may include at least on ingress port and/or at least one egress port.

The computer 700 can be connected to a storage device 718 that provides non-volatile storage for the computer. The storage device 718 can store an operating system 720, programs 722 (such as process(es) 724), and data. The storage device 718 can be connected to the computer 700 through a storage controller 714 connected to the chipset 1070606. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computer 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700. In some examples, the operations performed by a computing system may be supported by one or more devices similar to computer 700. Stated otherwise, some or all of the operations described herein may be performed by one or more computer devices 700 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 700. According to one embodiment, the operating system comprises the LINUX® operating system. According to another embodiment, the operating system comprises the WINDOWS® SERVER operating system from MICROSOFT® Corporation of Redmond, Washington. According to further embodiments, the operating system can comprise the UNIX® operating system or one of its variants. It should be appreciated that other operating systems can also be utilized. The storage device 718 can store other system or application programs and data utilized by the computer 700.

In one embodiment, the storage device 718 or other computer-readable storage media is encoded with computer-executable instructions which, when loaded into the computer 700, transform the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various processes described above with regard to FIGS. 3-6. The computer 700 can also include computer-readable storage media having instructions stored thereupon for performing any of the other computer-implemented operations described herein.

As illustrated in FIG. 7, the storage device 718 stores the event data 202, which are described above. Using instructions stored in the memory 118, the CPU(s) 704 may be configured to track changes to inventory items, provide updated data to an external system that reflects the changes to the inventory item, etc.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 17 or might utilize an architecture completely different than that shown in FIG. 7.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on."

As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method of determining a root cause of anomalous events in a networked computing environment, comprising:

determining, by a processor, an indirect dependency between nodes in a networked computing environment based on a network topology, the network topology indicating a respective dependency level for each node in the networked computing environment;

detecting, by the processor, alerts corresponding to anomalous events and associated with a first node of the nodes, the first node having an indirect dependency to a second node of the nodes according to the network topology;

correlating, by the processor, the alerts based on at least one of an activity type of the anomalous events or a root cause type of the anomalous events;

assigning, by the processor, a root cause of the anomalous events to the first node based at least in part on the first node having a lowest dependency level indicated in the network topology;

generating, by the processor, a directed acyclic graph comprising a first vertex representing the first node, a second vertex representing the second node, and a directed edge connecting the first vertex and the second vertex, wherein the directed edge:

indicates that the root cause caused the first node to affect the second node, and comprises a probability that the root cause caused the first node to affect the second node; and based on the directed edge:

sending, by the processor and to the first node, an incident ticket indicating the correlated alerts; and sending, by the processor and to the second node, a notification indicating:

a performance issue at the first node, and the root cause of the anomalous events.

2. The method of claim 1, wherein:

the network topology comprises a directional edge connecting the first node and a third node of the nodes, the directional edge representing a direction of a flow of activity between the first node and the third node; and detecting the alerts comprises detecting an alert corresponding to an anomalous event associated with a change in direction of the flow of activity.

3. The method of claim 2, further comprising:

monitoring the directional edge to detect the change in the direction of the flow of activity; and generating the alert based on detecting the change in the direction of the flow of activity.

4. The method of claim 1, wherein correlating the alerts comprises:

determining that the first node has a causal relationship with a third node of the nodes;

determining that a first alert of the alerts associated with the first node occurred during a time period;

determining that a second alert of the alerts associated with the third node occurred during the time period; and correlating the first alert and the second alert based on the causal relationship and determining that the first alert and the second alert occurred during the time period.

5. The method of claim 1, further comprising determining the root cause using a machine learning model configured to model a causal relationship between the root cause and the anomalous events based on the nodes and the network topology.

6. The method of claim 1, further comprising:

training a machine learning model using data set comprising historical anomalous events and corresponding root cause types; and using the machine learning model to determine the root cause type of the anomalous events.

7. The method of claim 1, wherein the network topology comprises a directional edge connecting the first node and the second node, the directional edge representing a causal relationship between the first node and the second node.

8. A system, comprising:

one or more processors; and one or more non-transitory computer-readable media storing computer-executable instructions that, when executed, cause the one or more processors to perform operations comprising:

determining an indirect dependency between nodes in a networked computing environment based on a network topology, the network topology indicating a respective dependency level for each node in the networked computing environment;

detecting alerts corresponding to anomalous events and associated with a first node of the nodes, the first node having an indirect dependency to a second node of the nodes according to the network topology;

correlating the alerts based on at least one of an activity type of the anomalous events or a root cause type of the anomalous events;

assigning a root cause of the anomalous events to the first node based at least in part on the first node having a lowest dependency level indicated in the network topology;

generating a directed acyclic graph comprising a first vertex representing the first node, a second vertex representing the second node, and a directed edge connecting the first vertex and the second vertex, wherein the directed edge:

indicates that the root cause caused the first node to affect the second node, and comprises a probability that the root cause caused the first node to affect the second node; and based on the directed edge:

sending, to the first node, an incident ticket indicating the correlated alerts; and sending, to the second node, a notification indicating:

a performance issue at the first node, and the root cause of the anomalous events.

9. The system of claim 8, wherein:

the network topology comprises a directional edge connecting the first node and a third node of the nodes, the directional edge representing a direction of a flow of activity between the first node and the third node; and the operations further comprise:

determining an anomalous event of the anomalous events based on detecting a change in the direction of the flow of activity; and generating an alert of the alerts corresponding to the anomalous event.

10. The system of claim 8, further comprising:
identifying a role associated with a user associated with the first node; and
generating the incident ticket based on the role.

11. The system of claim 8, further comprising:
detecting a subsequent alert corresponding to a subsequent anomalous event and associated with a third node of the nodes, the third node having an indirect dependency to the second node according to the network topology;
correlating the subsequent alert with the alerts based on an activity type of the subsequent anomalous event and the anomalous events;
assigning the likely root cause of the subsequent anomalous event and the anomalous events to the third node; and
sending, to the second node, a notification indicating:
a performance issue at the third node, and
the root cause of the subsequent anomalous event and the anomalous events.

12. The system of claim 8, wherein at least one of the anomalous events is associated with a request by the second node to perform an action at the first node.

13. The system of claim 8, wherein the network topology comprises a directional edge connecting the first node and the second node, the directional edge representing a causal relationship between the first node and the second node.

14. The system of claim 8, wherein:
the network topology comprises a directional edge connecting the first node and a third node of the nodes, the directional edge representing a direction of a flow of activity between the first node and the third node; and
detecting the alerts comprises detecting an alert corresponding to an anomalous event associated with a change in direction of the flow of activity.

15. A non-transitory computer-readable medium comprising instructions that, when executed by one or more processors, cause the one or more processors to perform operations comprising:
determining an indirect dependency between nodes in a networked computing environment based on a network topology, the network topology indicating a respective dependency level for each node in the networked computing environment;
detecting alerts corresponding to anomalous events and associated with a first node of the nodes, the first node having an indirect dependency to a second node of the nodes according to the network topology;
correlating the alerts based on at least one of an activity type of the anomalous events or a root cause type of the anomalous events;
assigning a root cause of the anomalous events to the first node based at least in part on the first node having a lowest dependency level indicated in the network topology;
generating a directed acyclic graph comprising a first vertex representing the first node, a second vertex representing the second node, and a directed edge connecting the first vertex and the second vertex, wherein the directed edge:
indicates that the root cause caused the first node to affect the second node, and
comprises a probability that the root cause caused the first node to affect the second node; and based on the directed edge:
sending, to the first node, an incident ticket indicating the correlated alerts; and
sending, to the second node, a notification indicating:
a performance issue at the first node, and
the root cause of the anomalous events.

16. The non-transitory computer-readable medium of claim 15, wherein:
the network topology comprises a directional edge connecting the first node and a third node of the nodes, the directional edge representing a direction of a flow of activity between the first node and the third node; and
detecting the alerts comprises detecting an alert corresponding to an anomalous event associated with a change in direction of the flow of activity.

17. The non-transitory computer-readable medium of claim 15, wherein the network topology comprises a directional edge connecting the first node and the second node, the directional edge representing a probability of a causal relationship between the first node and the second node.

18. The non-transitory computer-readable medium of claim 15, wherein detecting the alerts is based on monitoring the nodes in response to a previous anomalous event.

19. The non-transitory computer-readable medium of claim 15, wherein at least one of the anomalous events is associated with a request by the second node to perform an action at the first node.

20. A system for determining a root cause of anomalous events in a networked computing environment, the system comprising:
means for determining an indirect dependency between nodes in a networked computing environment based on a network topology, the network topology indicating a respective dependency level for each node in the networked computing environment;
means for detecting alerts corresponding to anomalous events and associated with a first node of the nodes, the first node having an indirect dependency to a second node of the nodes according to the network topology;
means for correlating the alerts based on at least one of an activity type of the anomalous events or a root cause type of the anomalous events;
means for assigning a root cause of the anomalous events to the first node based at least in part on the first node having a lowest dependency level indicated in the network topology;
means for generating a directed acyclic graph comprising a first vertex representing the first node, a second vertex representing the second node, and a directed edge connecting the first vertex and the second vertex, wherein the directed edge:
indicates that the root cause caused the first node to affect the second node, and
comprises a probability that the root cause caused the first node to affect the second node;
means for sending, based on the directed edge, to the first node, an incident ticket indicating the correlated alerts; and
means for sending, based on the directed edge, to the second node, a notification indicating:
a performance issue at the first node, and
the root cause of the anomalous events.

* * * * *